United States Patent
Fagley et al.

(10) Patent No.: US 8,399,142 B2
(45) Date of Patent: Mar. 19, 2013

(54) RELATIVE HUMIDITY PROFILE CONTROL STRATEGY FOR HIGH CURRENT DENSITY STACK OPERATION

(75) Inventors: John C. Fagley, Victor, NY (US); Manish Sinha, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 2708 days.

(21) Appl. No.: 11/130,804

(22) Filed: May 17, 2005

(65) Prior Publication Data

US 2006/0263651 A1    Nov. 23, 2006

(51) Int. Cl.
    *H01M 8/04* (2006.01)
(52) U.S. Cl. ........ 429/433; 429/413; 429/427; 429/428; 429/442
(58) Field of Classification Search .................. None
    See application file for complete search history.

(56) References Cited

U.S. PATENT DOCUMENTS

| | | |
|---|---|---|
| 4,769,297 A | 9/1988 | Reiser et al. |
| 5,441,819 A | 8/1995 | Voss et al. |
| 5,503,944 A | 4/1996 | Meyer et al. |
| 5,547,776 A | 8/1996 | Fletcher et al. |
| 5,773,160 A | 6/1998 | Wilkinson et al. |
| 6,117,577 A | 9/2000 | Wilson |
| 6,376,111 B1 | 4/2002 | Mathias et al. |
| 6,524,733 B1 | 2/2003 | Nonobe |
| 6,528,194 B1 | 3/2003 | Condit et al. |
| 6,562,501 B1 | 5/2003 | Nagamiya et al. |
| 6,566,001 B2 | 5/2003 | Yosida et al. |
| 2004/0170878 A1 | 9/2004 | Goebel |
| 2004/0247962 A1* | 12/2004 | Toukura .................. 429/22 |
| 2005/0003250 A1* | 1/2005 | Toukura .................. 429/22 |
| 2005/0227125 A1* | 10/2005 | Shaffer et al. ........... 429/13 |
| 2006/0269810 A1* | 11/2006 | Hase et al. .............. 429/26 |

OTHER PUBLICATIONS

Fagley, John; Gu, Wenbin; and Whitehead, Lee, "Thermal Modeling of a PEM Fuel Cell," pp. 141-149, published by ASME in "Fuel Cell Science, Engineering and Technology," Jun. 2004.
U.S. Appl. No. 11/130,806, filed May 17, 2005,Victor W. Logan, "Fuel Cell System Relative Humidity".
U.S. Appl. No. 11/130,807, filed May 17, 2005, Sinha et al., "Management via Dynamic Water Holdup Estimator in a Fuel Cell".
U.S. Appl. No. 11/130,825, filed May 17, 2005, Goebel et al., "Relative Humidity Control for a Fuel Cell".

* cited by examiner

*Primary Examiner* — Barbara Gilliam
*Assistant Examiner* — Angela Martin (57) ABSTRACT

A control strategy results in a relative humidity profile that is substantially the same or constant regardless of the operational power level of the fuel cell stack. The strategy maintains the relative humidity profile within a range that enables high current density operation of the fuel cell stack. The profile is achieved by adjusting a coolant flow rate through the fuel cell stack to maintain a temperature change across the coolant flow path from inlet to outlet substantially constant regardless of the operational power level of the fuel cell stack.

8 Claims, 4 Drawing Sheets

RELATIVE HUMIDITY PROFILE CONTROL STRATEGY FOR HIGH CURRENT DENSITY STACK OPERATION

FIELD OF THE INVENTION

The present invention relates to fuel cell stacks and, more particularly, to a control strategy to achieve a relative humidity profile for high current density fuel cell stack operation.

BACKGROUND OF THE INVENTION

Fuel cells are used as a power source for electric vehicles, stationary power supplies and other applications. One known fuel cell is the PEM (i.e., Proton Exchange Membrane) fuel cell that includes a so-called MEA ("membrane-electrode-assembly") comprising a thin, solid polymer membrane-electrolyte having an anode on one face and a cathode on the opposite face. The MEA is sandwiched between a pair of electrically conductive contact elements which serve as current collectors for the anode and cathode, which may contain appropriate channels and openings therein for distributing the fuel cell's gaseous reactants (i.e., $H_2$ and $O_2$/air) over the surfaces of the respective anode and cathode.

PEM fuel cells comprise a plurality of the MEAs stacked together in electrical series while being separated one from the next by an impermeable, electrically conductive contact element known as a bipolar plate or current collector. In some types of fuel cells each bipolar plate is comprised of two separate plates that are attached together with a fluid passageway therebetween through which a coolant fluid flows to remove heat from both sides of the MEAs. In other types of fuel cells the bipolar plates include both single plates and attached together plates which are arranged in a repeating pattern with at least one surface of each MEA being cooled by a coolant fluid flowing through the plates.

The fuel cells are operated in a manner that maintains the MEAs in a humidified state. The level of humidity or hydration of the MEAs affects the performance of the fuel cell. Too wet of an MEA limits the performance of the fuel cell stack and may prevent high current density operation. Specifically, formation of liquid water impedes the diffusion of gas to the MEAs, thereby limiting their performance. The liquid water also acts as a flow blockage reducing cell flow and causing even higher fuel cell relative humidity which can lead to unstable fuel cell performance. Too dry of an MEA also limits the performance and may prevent high current density operation. Specifically, as the humidity level decreases the protonic conductivity of the MEA will start to increase (especially near the inlet), resulting in additional waste heat and lower production of electricity. Furthermore, durability data suggests that large cycling in the moisture content of the MEA that leads to flooded and dried membranes can lead to significant loss in durability due to repeated membrane swelling and shrinking. Thus, flooded and dry operating conditions limit high current density operation and may reduce the durability of the MEA and the fuel cell.

Accordingly, it is advantageous to control the operation of the fuel cell in a manner that prevents and/or minimizes flooded operation and/or dry operation of the fuel cell. Furthermore, it would be advantageous to control the operation of the fuel cell in a manner that results in high current density operation of the fuel cell thereby providing for efficient operation. Moreover, it would be advantageous if such operation were achievable over the nominal power operating levels of a fuel cell, including upward and downward transients in the power level.

SUMMARY OF THE INVENTION

The present invention provides a control strategy that results in a relative humidity profile, i.e. the way the relative humidity changes along the flow path of the cathode reactant flowing from inlet to outlet, that is substantially the same or constant regardless of the operational power level of the fuel cell stack. The strategy maintains the relative humidity profile within a range that enables high current density operation of the fuel cell stack. The profile is achieved by adjusting a coolant flow rate through the fuel cell stack to maintain a temperature change across the coolant flow path from inlet to outlet substantially constant regardless of the operational power level of the fuel cell stack.

According to one aspect of the present invention, a method of operating a fuel cell system including a fuel cell stack and a coolant supply subsystem wherein the fuel cell stack has a cathode and coolant flow path therethrough is disclosed. The method includes: (1) operating the fuel cell stack to produce electricity; (2) monitoring a power level of the fuel cell stack; (3) determining a coolant flow through the coolant flow path to substantially achieve a predetermined coolant temperature change through the coolant flow path based on the power level; and (4) adjusting operation of the coolant supply subsystem to substantially achieve the determined coolant flow.

In another aspect of the present invention, a method of operating a fuel cell stack having a coolant flow path therethrough is disclosed. The method includes: (1) ascertaining a power level of the fuel cell stack; and (2) adjusting a coolant flow through the coolant flow path based on the power level. Adjusting the coolant flow includes: (a) supplying the coolant flow as pulses of flow through the coolant flow path when the power level is equal to or below a predetermined threshold; and (b) supplying the coolant flow as a continuous stream through the coolant flow path when the power level exceeds the predetermined threshold.

In yet another aspect of the present invention, a fuel cell system is disclosed. The fuel cell system includes a fuel cell stack having cathode and coolant flow paths therethrough. There is a coolant supply subsystem operable to supply a coolant flow through the coolant flow path that maintains a temperature change across the coolant flow path from inlet to outlet substantially constant during nominal operation of the fuel cell stack regardless of a power level of the fuel cell stack. The coolant supply subsystem is operable to selectively provide the coolant flow as pulses of coolant flow and as a continuous stream of coolant flow.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. As used herein, the term "module" refers to an application specific integrated circuit (ASIC), an electronic circuit, a processor (shared, dedicated or group) and memory that execute one or more software or firmware programs, a combinational logic circuit, or other suitable components that provide the described functionality.

The present invention is directed to a method of controlling the operation of a fuel cell and/or fuel cell stack so that a desired relative humidity profile is achieved for the membranes in the fuel cell(s). In this regard, the present invention is discussed with reference to specific mechanizations for a fuel cell system having a fuel cell stack therein. It should be appreciated, however, that the mechanizations shown are merely exemplary and that the methods of the present invention are applicable to other fuel cell systems having other mechanizations.

Figure 1:
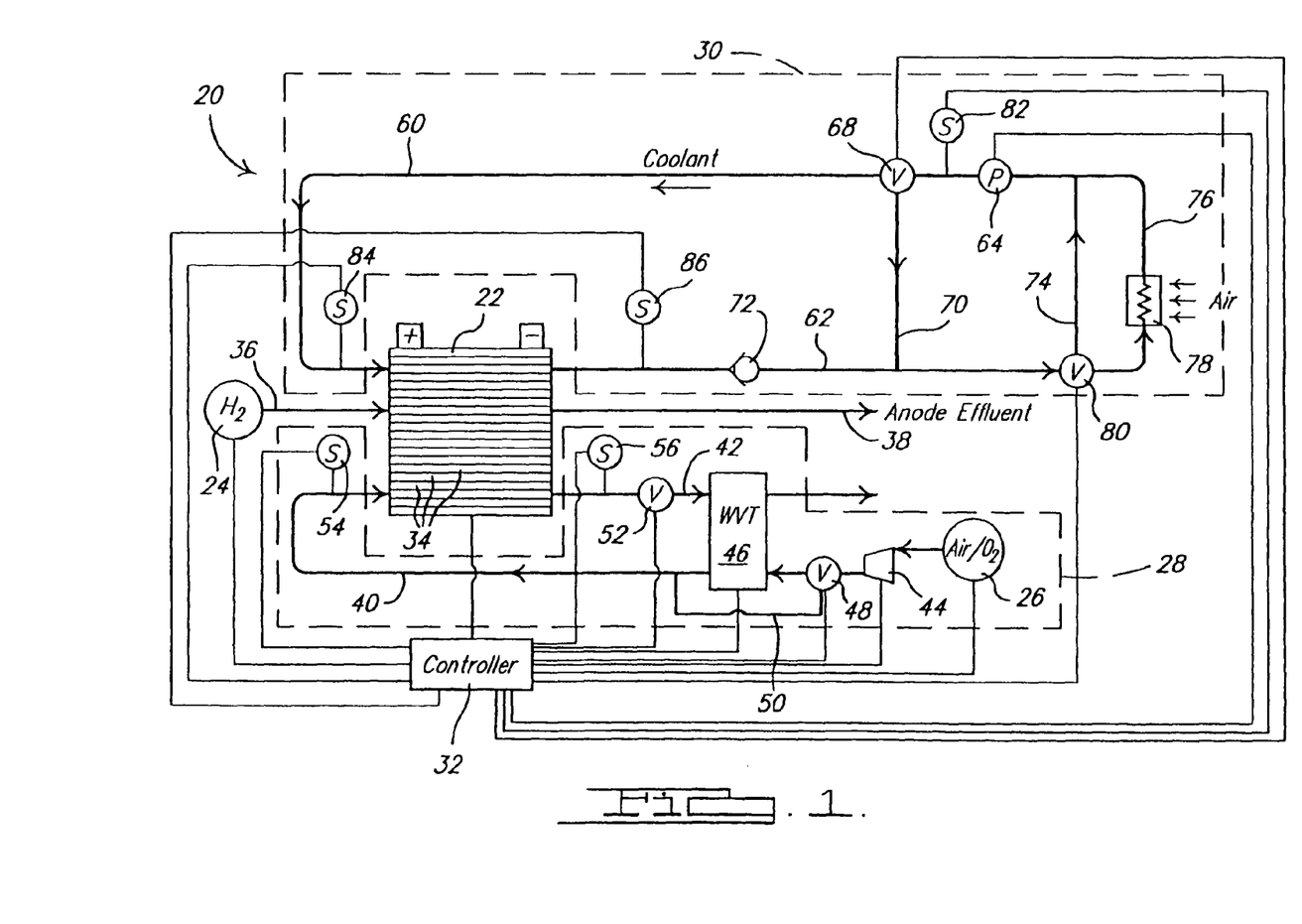
FIG. 1 is a schematic representation of a first preferred embodiment of a fuel cell system with which the control strategy of the present invention can be employed.

A first preferred mechanization of a fuel cell system 20 with which the methods of the present invention can be employed is schematically represented in FIG. 1. Fuel cell system 20 includes a fuel cell stack 22 which is connected to a hydrogen source 24 and an oxygen source 26, as are well known in the art. Oxygen source 26 is part of a cathode supply subsystem 28, described in more detail below. Fuel cell system 20 also includes a coolant supply subsystem 30 which supplies a coolant flow through fuel cell stack 22. A controller 32 is operable to control the operation of fuel cell system 20 and the components therein.

Fuel cell stack 22 includes a plurality of fuel cells 34 arranged in a stacked configuration. Fuel cells 34 include a plurality of membrane electrode assemblies (MEAs) each disposed between a plurality of bipolar plates. As is known in the art, the stack may also include a plurality of gas distribution layers, a plurality of anode manifolds, a plurality of cathode manifolds, a plurality of coolant manifolds and end plates, all arranged in a stacked relation. The sequence of MEAs and bipolar plates is repeated to provide the desired voltage output for fuel cell stack 22. As is known in the art, each MEA includes a membrane in the form of a thin proton transmissive non-electrically conductive solid polymer electrolyte. An anode catalyst layer is provided on one surface of the membranes and a cathode catalyst layer is provided on the opposite surface of the membranes. For purposes of the present invention, the configuration of fuel cell stack 22 can be of any known arrangement. Fuel cell stack 22 has an anode flow path through which the anode reactant gas flows, a cathode flow path through which the cathode reactant gas flows and a coolant flow path through which the coolant flows.

Hydrogen source 24 can include a fuel processor or stored hydrogen, as is known in the art. Hydrogen source 24 supplies a flow of anode reactant to the anode flow path in fuel cell stack 22 via anode supply plumbing 36. Anode effluent is exhausted from the anode flow path of fuel cell stack 22 via anode exhaust plumbing 38. Controller 32 communicates with hydrogen source 24 and is operable to control the supplying and exhausting of anode reactant/effluent to/from the anode flow path of fuel cell stack 22. Controller 32 commands a required amount of hydrogen to be supplied to the anode flow path and coordinates the exhausting of anode effluent therefrom, as needed.

Oxygen source 26 can be air drawn from the ambient or pure $O_2$ provided from a storage device. Cathode reactant is supplied to the cathode flow path of fuel cell stack 22 via cathode supply plumbing 40. Cathode effluent is exhausted from the cathode flow path of fuel cell stack 22 via cathode exhaust plumbing 42. The cathode reactant gas is supplied to fuel cell stack 22 by compressor 44. The cathode reactant gas flows from compressor 44 through a humidifying device 46, in this case in the form of a water vapor transfer (WVT) device, wherein the cathode reactant gas is humidified. A humidifying bypass valve 48 is selectively operable to allow a portion of the cathode reactant to flow through bypass loop 50 and avoid WVT device 46 to allow for greater customization of the humidity of the cathode reactant flowing to the cathode flow path, as discussed in more detail below.

The cathode reactant gas flows through the cathode flow path in fuel cells 34 of fuel cell stack 22 and exits fuel cell stack 22 in the form of cathode effluent via cathode exhaust plumbing 42. A back pressure valve 52 is disposed in cathode exhaust plumbing 42. Back pressure valve 52 is operable to control the outlet pressure of the cathode gas exiting the cathode flow path within fuel cell stack 22. The cathode effluent is routed through WVT device 46. Cathode supply subsystem 28 also includes various sensors 54, 56 which measure various operating parameters of cathode supply subsystem 28. Sensors 54, 56 may include temperature sensors, pressure sensors, flow rate sensors, humidity sensors, and the like, as needed, to monitor and control the operation of cathode supply subsystem 28. As used herein, the term "cathode gas" may refer to both the cathode reactant and the cathode effluent.

Sensors 54, 56 communicate with the respective cathode supply and exhaust plumbing 40, 42. Sensors 54, 56 provide a variety of information regarding the operating conditions of fuel cell stack 22 that are occurring within the cathode flow path, as needed for the particular mechanization and control strategy. For example, sensors 54, 56 can advise as to the temperature, relative humidity, flow rate, and/or the pressures of the cathode gas flowing into and exiting the cathode flow path within fuel cell stack 22.

Within WVT device 46, humidity from the cathode effluent stream is transferred to the cathode reactant stream being supplied to fuel cell stack 22. The operation of WVT device 46 can be adjusted to provide differing levels of water vapor transfer between the cathode effluent stream and the cathode reactant stream. Furthermore, bypass valve 48 can be selectively operated to allow a portion or an entirety of the cathode reactant gas supplied by compressor 44 to flow through bypass loop 50 and avoid humidification within WVT device 46. By controlling the operation of WVT device 46 and the amount of cathode reactant that flows through WVT device 46 and that bypasses WVT device 46, a desired relative humidity for the cathode reactant flowing into the cathode flow path of fuel cell stack 22 can be achieved.

Controller 32 communicates with compressor 44, WVT device 46, bypass valve 48, back pressure valve 52, and sensors 54, 56 of cathode supply subsystem 28. Controller 32 monitors the output of sensors 54, 56 and controls the operation of compressor 44, WVT device 46, bypass valve 48 and back pressure valve 52 to achieve the desired operation of cathode supply subsystem 28.

Coolant supply subsystem 30 supplies a coolant stream to the coolant flow path within fuel cell stack 22 via coolant supply plumbing 60 and removes coolant from the coolant flow path via coolant exit plumbing 62. A pump 64 is operable to cause the coolant stream to flow through coolant supply plumbing 60, the coolant flow path within fuel cell stack 22, and coolant exit plumbing 62. A stack bypass valve 68 is selectively operable to divert a portion of the coolant stream exiting pump 64 through a stack bypass loop 70 and into coolant exit plumbing 62 wherein it joins the portion of the coolant stream that has flowed through the coolant flow path in fuel cell stack 22. A check valve 72, or similar device, prevents coolant flowing through bypass loop 70 from back flowing into the coolant flow path via the coolant exit plumbing 62.

The coolant stream within coolant exit plumbing 62 flows back to pump 64 through either a radiator bypass loop 74 or a radiator loop 76 having an air-cooled radiator 78 therein. The position of a radiator bypass valve 80 determines whether the coolant stream within coolant exit plumbing 62 flows through bypass loop 74 or radiator loop 76 prior to flowing back to pump 64 for recirculation through fuel cell stack 22.

Coolant supply subsystem 30 also includes a plurality of sensors 82, 84, 86 that measure various operating parameters of coolant supply subsystem 30, such as temperatures, flow rates, and pressures. Sensors 82, 84, 86 communicate with controller 32 to enable controller 32 to control and coordinate the operation of coolant supply subsystem 30 to obtain a desired temperature for the coolant flowing into the coolant flow path and the coolant exiting the coolant flow path.

Controller 32 communicates with pump 64, bypass valves 68, 80 and sensors 82, 84, 86 to control the operation of coolant supply subsystem 30. By controlling the operation (on/off and speed) of pump 64, the position of stack bypass valve 68, and the position of radiator bypass valve 80, the duration, quantity and temperature of the coolant flowing into and exiting the coolant flow path of fuel cell stack 22 can be controlled.

Coolant supply subsystem 30 extracts heat from fuel cell stack 22 and transfers that heat to the ambient via radiator 78. The coolant inlet temperature is controlled by adjusting the radiator bypass valve 80 position, so that the blend of coolant flowing through radiator bypass loop 74 and radiator loop 76 mixes to a desired temperature set point. The blended coolant is pumped through coolant supply plumbing 60 to the inlet of the coolant flow path in fuel cell stack 22. The position of stack bypass valve 68 can also affect the operation of bypass valve 80 by routing a portion of the mixed stream directly to coolant exit plumbing 62 without passing through the coolant flow path within fuel cell stack 22. Thus, the temperature of the coolant within coolant exit plumbing 62 is a function of the position of stack bypass valve 68, the inlet temperature of the coolant flowing into the coolant flow path and the heat extracted from fuel cell stack 22 by the coolant stream. As a result, the stack coolant inlet temperature is a function of the position of radiator bypass valve 80, the radiator coolant outlet temperature, the position of stack bypass valve 68 and the temperature of the coolant within coolant exit plumbing 62.

The coolant temperature exiting fuel cell stack 22 is controlled by adjusting the coolant pump speed so that the coolant flow rate results in the desired temperature rise. Thus, the coolant outlet temperature is a function of the coolant flow rate, the coolant inlet temperature flowing into the coolant flow path and the stack waste heat generated and removed by the coolant stream.

Controller 32, as stated above, communicates with the various components of fuel cell system 20 to control and coordinate the operation of these various components. Controller 32 is shown as being a single integral controller. It should be appreciated, however, that controller 32 can be comprised of a plurality of discrete individual controllers that function together to control and coordinate the operation of fuel cell system 20. Furthermore, it should also be appreciated that controller 32 will contain one or more modules, as needed, to perform the stated functions of controller 32. Additionally, controller 32 can have functionality and capabilities in addition to those discussed to control and coordinate the operation of fuel cell system 20.

Figures 4, 5:
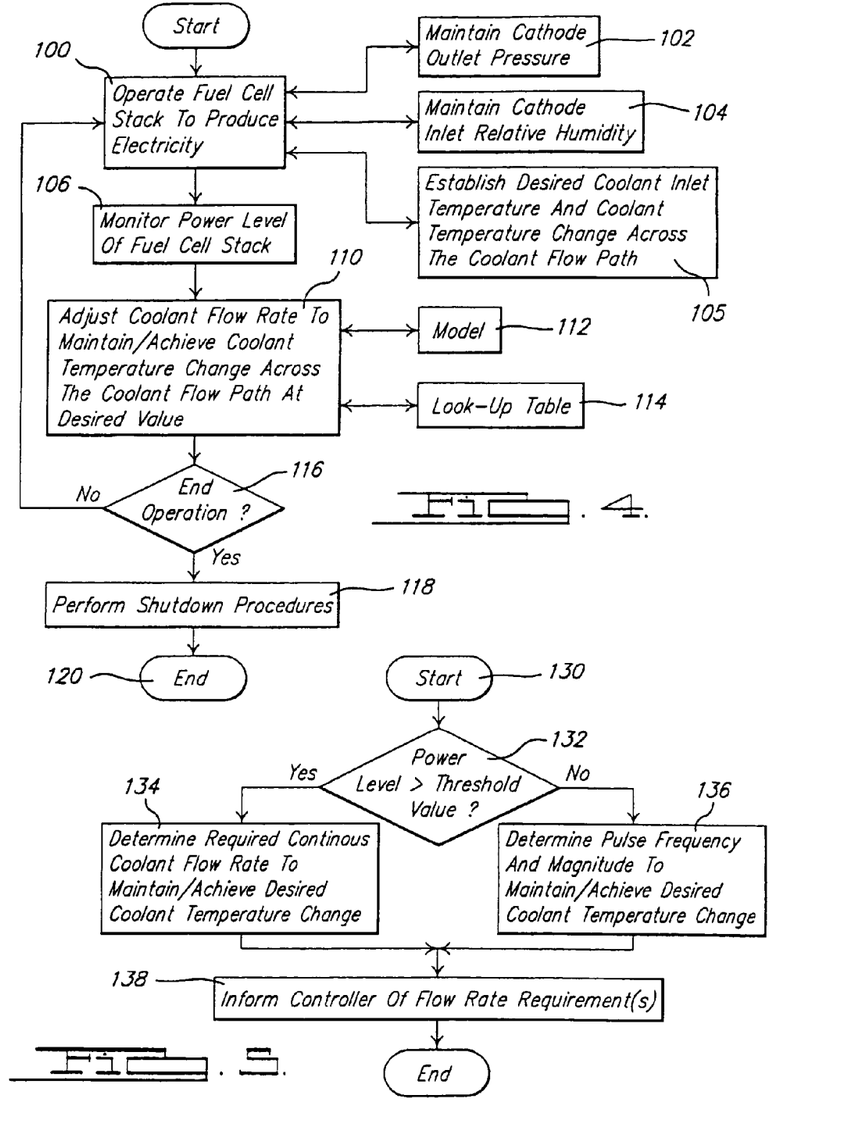
FIG. 4 is a flowchart illustrating the control strategy of the present invention.
FIG. 5 is a flowchart illustrating the determination of the required coolant flow rate portion of the control strategy of the present invention.

Controller 32 monitors various operating parameters of fuel cell system 20 and commands various components of fuel cell system 20 to operate in the manner that achieves a desired operational condition. The basic control strategy according to the principles of the present invention is illustrated in FIG. 4. Controller 32 commands various components of fuel cell system 20 to operate to cause fuel cell stack 22 to produce electricity, as indicated in block 100. To accomplish this, controller 32 commands anode reactant, via hydrogen source 24, to be supplied to the anode flow path via anode supply plumbing 36 in a quantity sufficient to meet the power demand. Controller 32 also removes anode effluent from the anode flow path via anode exhaust plumbing 38, as needed. Controller 32 commands cathode supply subsystem 28 to supply cathode reactant to the cathode flow path of fuel cell stack 22 in a quantity sufficient to meet the power demand. Controller 32 controls the operation of cathode supply subsystem 28 to achieve a desired cathode gas inlet pressure at low power (idle) operation and at high power operation. For example, controller 32 can command an inlet cathode pressure at idle of 126 kPa and a full or high power inlet pressure of 150 kPa. The inlet pressure will vary between the low power inlet pressure and the high power inlet pressure as the power level of fuel cell stack 22 varies between the idle and full power conditions.

Controller 32 also coordinates the operation of back pressure valve 52 to achieve a desired cathode gas outlet pressure. Preferably, controller 32 maintains the cathode gas outlet pressure substantially constant regardless of a power level of fuel cell stack 22, as indicated in block 102. For example, controller 32 can operate cathode supply subsystem 28 to maintain a cathode gas outlet pressure of 125 kPa regardless of the operational power level of fuel cell stack 22.

Controller 32 also controls the operation of cathode supply subsystem 28 to cause the cathode reactant flowing into the cathode flow path to have a desired relative humidity, such as 65%. Preferably, controller 32 maintains the cathode reactant inlet relative humidity the same regardless of the operational power level of fuel cell stack 22, as indicated in block 104. To achieve a desired relative humidity, the cathode reactant gas (in its entirety or a portion thereof) flows through WVT device 46 prior to entering the cathode flow path. Within WVT device 46, water vapor is transferred from the cathode effluent to the cathode reactant gas. Depending upon the operational state of fuel cell system 20 and WVT device 46, there may be some cycling in the relative humidity of the cathode reactant exiting WVT device 46. One way to eliminate or minimize this effect is to actively control the quantity of the cathode reactant bypassing WVT device 46. Controller 32 commands bypass valve 48 to route a portion or an entirety of the cathode reactant around WVT device 46 via bypass loop 50. The humidified and unhumidified cathode reactant streams are mixed together in cathode supply plumbing 40 prior to entering into the cathode flow path. As a result, controller 32 can achieve a desired relative humidity for the cathode reactant flowing into the cathode flow path and can maintain that relative humidity substantially constant regardless of the operational power level of fuel cell stack 22.

Controller 32 also controls the operation of coolant supply subsystem 30. Controller 32 commands coolant supply subsystem 30 to achieve a desired inlet temperature for the coolant stream flowing into the coolant flow path. Additionally, controller 32 controls the operation of coolant supply subsystem 30 so that a desired temperature change across the coolant flow path from inlet to outlet occurs, as indicated in block 105. Coolant inlet temperature and the temperature change across the coolant flow path from inlet to outlet will vary for the particular fuel cell stack 22 upon which the control strategy of the present invention is employed. That is, different fuel cell stacks will have different desired coolant inlet temperatures and temperature changes across the coolant flow path from inlet to outlet. Regardless of the stack, controller 32 commands coolant supply subsystem 30 to cause a desired inlet temperature to occur and a desired temperature change across the coolant flow path from inlet to outlet to occur.

Thus, in the control strategy of the present invention, controller 32 commands cathode supply subsystem 28 to maintain a cathode outlet pressure and a cathode reactant inlet relative humidity substantially constant regardless of the operational power level of fuel cell stack 22. As a result, the pressure drop across the cathode flow path at low power is substantially a fixed value, the pressure drop across the cathode flow path at high power is substantially a fixed value and the value of the pressure drop across the cathode flow path between low and high power operation will vary between these two fixed pressure drops.

With fuel cell stack 22 operating to produce electricity, controller 32 monitors a power level of fuel cell stack 22, as indicated in block 106. The control strategy of the present invention establishes a desired fixed temperature change across the coolant flow path from inlet to outlet that results in a desired relative humidity profile within fuel cell stack 22. Specifically, with the inlet relative humidity of the cathode gas being substantially established or maintained at a desired level, the pressure drop across the fuel cell stack also being fixed within predetermined boundaries, the coolant supply subsystem 30 is operated to cause a substantially constant or fixed temperature change across the coolant flow path from inlet to outlet regardless of a power level of the fuel cell stack. The fixed temperature change across the coolant flow path from inlet to outlet results in a same temperature change in the cathode gas across the cathode flow path. In other words, the coolant and cathode streams are taken to be at the same temperature, which is justified because of the large heat transfer area-to-volume ratio for a typical fuel cell. A desired inlet temperature can be selected that results in the cathode reactant gas having a desired relative humidity flowing into the cathode flow path. For example, the water holding capacity of the cathode gas will change based upon its temperature. As a result, the relative humidity of the cathode gas just downstream of WVT device 46 can be adjusted by providing a coolant inlet temperature of a desired magnitude. With a desired inlet temperature established, a desired temperature change across the coolant flow path from inlet to outlet is used that provides a desired relative outlet humidity for the cathode effluent exiting the cathode flow path.

The temperature change across the coolant flow path from inlet to outlet, the relative humidity of cathode reactant flowing into the cathode flow path and the pressure drop across the cathode flow path at a given power level depend upon the specific design and desired operation of the fuel cell stack. These values will be substantially the same for all expected operating conditions for a particular fuel cell stack. For different designs or different desired operation of a different fuel cell stack, however, the values of these various parameters may differ. The control strategy, however, is still implemented using the applicable values.

The quantity of waste heat generated in fuel cell stack 22 during the production of electricity will vary with the operational power level. That is, as the power level increases, additional waste heat will be generated that needs to be removed from fuel cell stack 22 to maintain a desired operational temperature. Conversely, as the power level decreases, the quantity of waste heat generated decreases so that a smaller amount of heat needs to be removed from the fuel cell stack to maintain a desired operational temperature. Controller 32 takes this changing power level into account when determining how to control coolant supply subsystem 30 to maintain the desired temperature change across the coolant flow path from inlet to outlet. Specifically, as indicated in block 110, the coolant flow rate through the coolant flow path is adjusted based upon the operational power level to maintain the coolant temperature change across the coolant flow path from inlet to outlet at the desired fixed value. Controller 32 can utilize a model, as indicated in block 112, or a look-up table, as indicated in block 114, to obtain the required coolant flow regime to maintain the desired temperature change across the coolant flow path from inlet to outlet, as described in more detail below. Controller 32 then adjusts the operation of coolant supply subsystem 30 to achieve the required coolant flow rate thereby maintaining the desired fixed temperature change across the coolant flow path from inlet to outlet.

If the operation of fuel cell stack 22 continues, as indicated in decision block 116, the control strategy begins again and continues to loop through this scenario (blocks 100-116) until it is desired to end the operation of the fuel cell stack. When it is desired to cease the operation of the fuel cell stack, as indicated in block 116, a shutdown procedure is performed, as indicated in block 118. The shutdown procedure may include establishing certain operational parameters that vary from the nominal operational parameters to cause the condition of the stack to be in a desired state prior to shutting down. For example, it may be desired to achieve a certain humidity state for shutdown that is different from the nominal operating conditions. Once the shutdown procedures are completed, the operation of fuel cell stack 22 ends, as indicated in block 120.

As stated above, controller 32 can utilize a model to determine the required adjustments to the coolant flow rate, as indicated in block 112. Specifically, an algorithm is used to provide a transient model of the operation of the fuel cell stack and determines a required flow regime to maintain the fixed temperature change. In determining the appropriate flow regime, the transient model predicts the operation of the fuel cell stack taking into account the various operating parameters, such as the power level, coolant inlet temperature, cathode inlet and outlet pressures, the cathode inlet relative humidity, the stoichiometric quantity of cathode reactant, and the desired temperature change across the coolant flow path from inlet to outlet. The algorithm also takes into account the waste heat generated for that particular power level and the thermal responses of the hard and soft goods of the fuel cell stack. With the quantity of waste heat to be removed determined, the required flow regime to maintain the fixed temperature change across the coolant flow path from inlet to outlet can be determined. It should be appreciated that the algorithm also takes into account the specific components that comprise coolant supply subsystem 30 and the limitations of their dynamic responses. As such, the algorithm is specifically tuned or developed for the specific components and operational strategies to be employed for a particular fuel cell system. In addition, during system operation, the feedback of sensed coolant outlet temperature may be used to fine tune the coolant flow rate and pulsing parameters.

Alternatively, instead of using an algorithm, a look-up table can be employed, as indicated in block 114. The look-up table will provide required flow regimes to maintain the desired fixed temperature change across the coolant flow path from inlet to outlet based upon the power level and other operating parameters of fuel cell system 20. That is, the look-up table will contain multiple tables that correspond to various operating conditions of fuel cell system 20 and provides the required flow regime to maintain the temperature differential across the coolant flow path from inlet to outlet. The look-up table will be established for a particular fuel cell system 20 and/or fuel cell stack 22. The data within the look-up table is preferably based upon empirical data gathered from bench testing a representative fuel cell stack and/or fuel cell system having a dynamic characteristic and performance that are substantially the same as those within which the look-up table is to be utilized.

Accordingly, controller 32 can access a model that uses an algorithm to predict the waste heat generated based upon the operating parameters of the fuel cell stack and provide a desired flow regime to maintain the desired coolant temperature change or utilize a look-up table that provides the required coolant flow regime based upon the various operating parameters of the fuel cell stack. Regardless of the use of a model or a look-up table, controller 32 is provided with a required flow regime to maintain the desired temperature change across the coolant flow path from inlet to outlet. Based upon this flow regime, controller 32 adjusts the operation of coolant supply subsystem 30 to meet the required flow regime.

Referring now to FIG. 5, the determination of the required flow regime using either the model and/or the look-up table is illustrated. When controller 32 accesses either the model and/or the look-up table, a start of the determination of the flow regime commences, as indicated in block 130. The operational power level of fuel cell stack 22 relative to a threshold value (e.g., 0.3 A/cm$^2$) determines the type of flow regime (continuous or pulse) that is implemented, as indicated in decision block 132. The decision between using either a continuous or discontinuous (pulsing) flow regime takes into account the components of the particular mechanization of coolant supply subsystem 30. That is, the components of coolant supply subsystem 30 will have certain operational limitations, such as flow rates, response times, etc., that will limit the potential flow regimes that can be implemented for a particular coolant supply subsystem 30. For example, during high power operation, the waste heat generated within fuel cell stack 22 will be the greatest and require the highest coolant flow rate to maintain the fixed temperature change across the coolant flow path from inlet to outlet. In contrast, during low power (idle) operation, the least amount of heat will be generated and required to be removed to maintain the fixed temperature change across the coolant flow path from inlet to outlet. The difference between the highest and lowest flow rates can be two orders of magnitude. The response of the components utilized in coolant supply subsystem 30, however, may not be able to be varied over this level of magnitude and still maintain the desired fixed temperature change across the coolant flow path from inlet to outlet because the pump cannot be turned down this far. As a result, pulsing of the coolant is used at low power levels.

Additionally, the determination of the required coolant flow regime can also be influenced by other operating concerns of fuel cell stack 22 and/or fuel cell system 20. For example, during operation of fuel cell stack 22, gas bubbles, such as $H_2$ or air may form within the coolant flow path. These gas bubbles could potentially become entrapped within the coolant flow path and affect the ability of the coolant to remove heat from the fuel cell stack. Furthermore, these gas bubbles may be difficult to remove. During high power operation, the coolant flow rate is usually sufficient to remove the gas bubbles from the coolant flow path. During low power operation, however, the required coolant flow rate to maintain the temperature differential across the coolant flow path from inlet to outlet at the fixed level may be insufficient to remove the gas bubbles. Accordingly, it may be desired to have a minimum coolant flow rate that is sufficient to remove the gas bubbles from the coolant flow path, regardless of the operational power level of the fuel cell stack.

As a result of these needs, the model and look-up table provide different flow regimes to meet these various needs. Specifically, the model and look-up table provide different flow regimes based upon the operational power level of the fuel cell stack 22. The model and look-up table provide required continuous coolant flow regime or pulsing/discontinuous coolant flow regime to achieve the desired coolant temperature change that maintains the flow velocity sufficient to remove gas bubbles from the coolant flow path and takes into account the response times of the various components. In addition, during system operation, the feedback of sensed coolant outlet temperature may be used to fine tune the coolant flow rate and pulsing parameters.

For example, when the power level is greater than a threshold value (e.g., 0.3 A/cm$^2$), as indicated in decision block 132, the model and look-up table will determine a required continuous coolant flow rate to maintain the desired coolant temperature change, as indicated in block 134. The required continuous coolant flow rate has a velocity sufficient to remove the gas bubbles from the coolant flow path. In contrast, when the power level is equal to or below the threshold value, as indicated in decision block 132, the model and look-up table will determine a required pulse frequency and magnitude to maintain the desired coolant temperature change across the coolant flow path from inlet to outlet, as indicated in block 136. The magnitude of the pulse is a value sufficient to remove the gas bubbles from the coolant flow path. The frequency at which the pulse of the coolant stream flows through the coolant flow path provides for moving sufficient waste heat to maintain the coolant temperature change across the flow path at the fixed value. For example, the model and look-up table can provide a pulsing flow regime that calls for a magnitude equal to five (5) liters per minute per 300 cm$^2$ plate for one second and no flow for two seconds. The periods of no flow will increase in duration as the power level of fuel cell stack 22 decreases. In contrast, as the power level increases, the periods of no coolant flow will decrease. If the duration is too large, the relative humidity profile throughout the fuel cell stack may exceed that desired and the temperature change across the coolant flow path from inlet to outlet may also deviate from the desired fixed value.

The pulsing regime also takes into account the response time of the components of coolant supply subsystem 30.

Regardless of the determination of a continuous coolant flow regime or a pulsing coolant flow regime, the flow regime is communicated to the controller, as indicated in block 138. Controller 32 then adjusts the coolant flow rate to achieve the required flow regime and maintain the temperature change across the coolant path at the desired value.

Referring back to the first embodiment mechanization shown in FIG. 1, when the flow regime is a continuous coolant flow controller 32 will command pump 64 to operate at a speed sufficient to provide the required coolant flow rate to the coolant flow path. When pump 64 is capable of producing the required flow rate, stack bypass valve 68 is operated to prevent any coolant from flowing through bypass loop 70. If the required flow rate is lower than the minimum flow rate capable by pump 64, pump 64 can be operated at its minimum (or higher) flow rate and the excess coolant diverted through stack bypass loop 70 via operation of stack bypass valve 68. The use of stack bypass valve 68 and stack bypass loop 70 may also be desirable if it is preferable to maintain the operation of pump 64 substantially constant, such as for efficiency purposes, and divert any excess coolant flow through bypass loop 70. The end result is that the required flow rate of coolant through the coolant flow path of fuel cell stack 22 is achieved.

When a pulsing flow regime is dictated by the model or look-up table, pump 64 is commanded by controller 32 to operate at a flow rate that will meet the required magnitude for the coolant flow through fuel cell stack 22. Bypass valve 68 is selectively operated to allow the entirety or portion thereof of the coolant stream to flow through the coolant flow path for the required duration (flow duration) and the entire coolant stream to flow through stack bypass loop 70 for the required duration (no flow duration). In this manner, pump 64 can be continuously operated to provide the required coolant flow rate while bypass valve 68 selectively directs the coolant flow through either the coolant flow path or stack bypass loop 70 to match the required flow regime determined by the model or look-up table.

Figure 2:
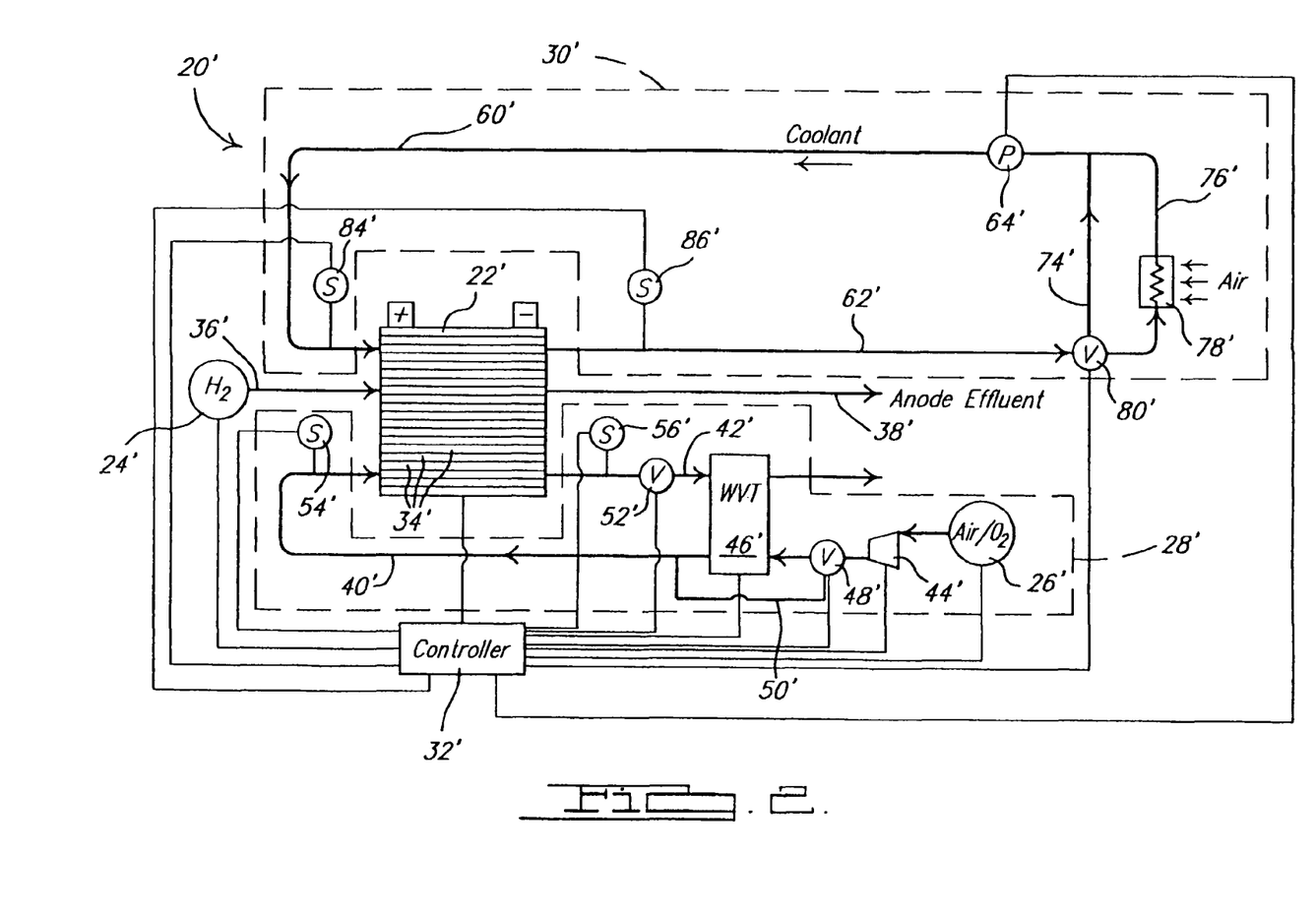
FIG. 2 is a schematic representation of a second preferred embodiment of a mechanization of a fuel cell system with which the control strategy of the present invention can be employed.

Referring now to FIG. 2, a second preferred embodiment of a fuel cell system 20' mechanization with which the control strategy of the present invention can be employed is illustrated. Fuel cell system 20' utilizes a different mechanization for coolant supply subsystem 30' than employed in fuel cell system 20 shown in FIG. 1. The main difference is that coolant supply subsystem 30' does not include a stack bypass valve nor a stack bypass loop. Accordingly, the controlling of coolant supply subsystem 30' to meet the required flow regime is different. With this mechanization, pump 64' is sized to provide both the minimum continuous coolant flow rate and the maximum continuous flow rate that will be required to maintain the fixed temperature change across the coolant flow path from inlet to outlet during nominal operation. Additionally, pump 64' is designed to be cycled on and off to meet the pulsing coolant flow regime requirements.

When the flow regime dictates that a continuous coolant flow be supplied through the coolant flow path, controller 32' commands pump 64' to operate at a speed sufficient to provide the required continuous coolant flow rate. When the flow regime dictates that the coolant flow be pulsed, controller 32' commands pump 64' to cycle on and off, at the appropriate intervals, to meet the required pulsing. Additionally, controller 32' commands pump 64' to operate at a speed sufficient to provide the desired magnitude of coolant flow. With this mechanization, the magnitude, duration of pulsing and duration of no coolant flow take into account the response time of pump 64'. That is, pump 64' requires a certain amount of time to go from no flow to the required flow rate and from the required flow rate to zero flow.

Thus, the control strategy of the present invention can be employed with a fuel cell system 20' having a coolant supply subsystem 30' that utilizes a single pump to provide both a continuous flow rate and a discontinuous flow rate to maintain the fixed temperature change through the coolant flow path regardless of the power level of operation of the fuel cell stack.

Figure 3:
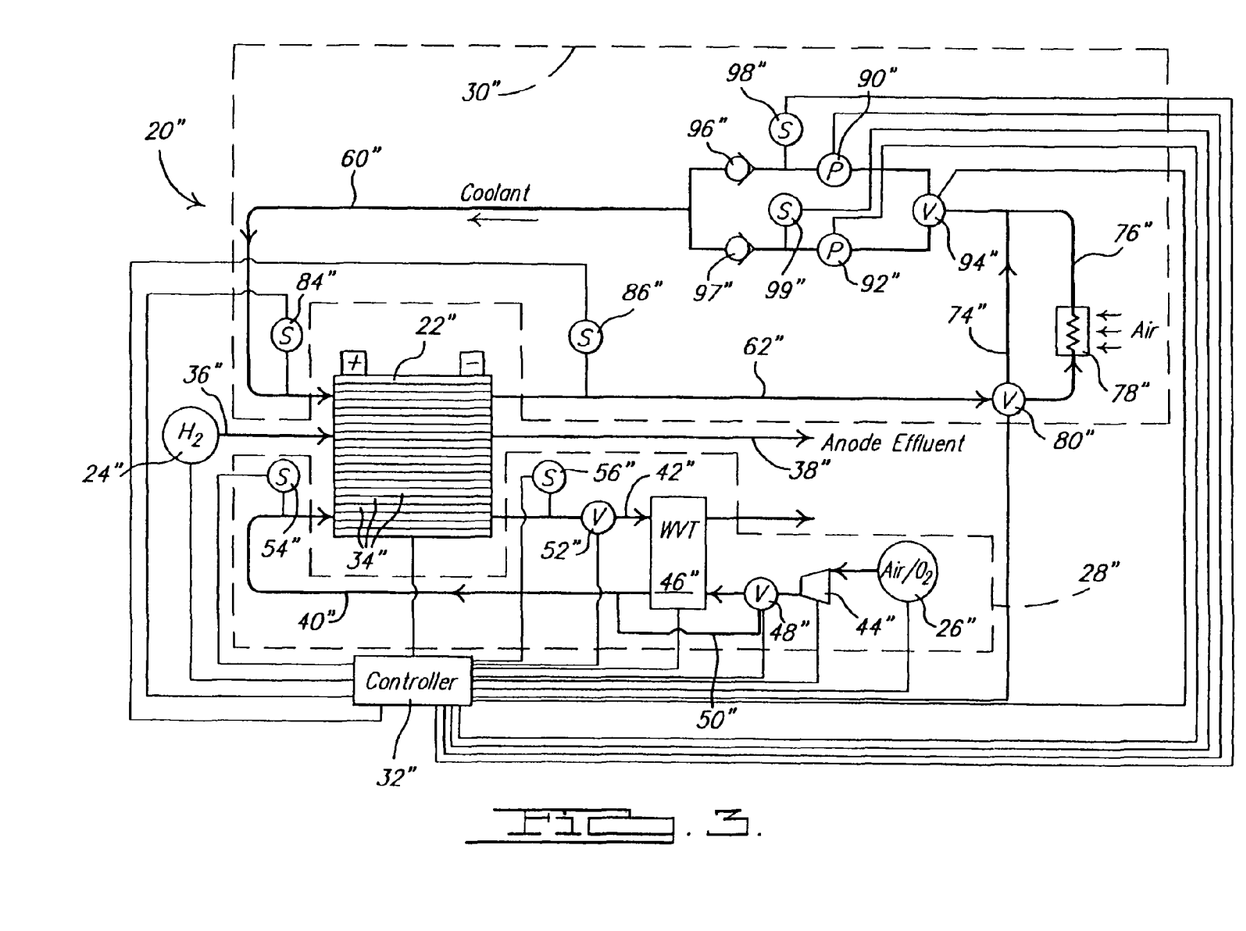
FIG. 3 is a schematic representation of a third preferred embodiment of a mechanization of a fuel cell system with which the control strategy of the present invention can be employed.

Referring now to FIG. 3, a third preferred embodiment of a fuel cell system 20" mechanization with which the control strategy of the present invention can be employed is illustrated. The coolant supply subsystem 30" of fuel cell system 20" differs from the mechanization used in the first and second embodiments shown in FIGS. 1 and 2. Specifically, in this mechanization, two separate pumps 90", 92" are employed to meet the required flow regimes. First pump 90" is designed to provide the continuous flow rate of coolant while second pump 92" is designed to provide the discontinuous or pulsing of coolant flow. Thus, first pump 90" is of a type that efficiently provides a continuous flow rate of varying magnitude while second pump 92" is of the type that efficiently provides discontinuous or pulses of coolant flow. For example, first pump 90" can be a variable speed centrifugal pump while second pump 92" can be a variable volume positive displacement pump.

A valve 94" communicates with controller 32" and is selectively operable to route the coolant flowing through coolant supply subsystem 30" to either first pump 90" or second pump 92". First and second check valves 96", 97" downstream of the respective first and second pumps 90", 92" prevent backflow through the associated pump when the other pump is operating to supply the coolant flow to the coolant flow path. Sensors 98", 99" are provided downstream of the respective first and second pumps 90", 92" and communicate with controller 32". Sensors 98", 99" provide controller 32" with information such as the flow rates produced by each pump 90", 92".

With this mechanization, when the flow regime calls for a continuous flow of coolant through the coolant flow path, controller 32" commands valve 94" to route all coolant flowing through coolant supply subsystem 30" to first pump 90". Controller 32" also commands first pump 90" to operate at a speed that supplies the required flow rate of coolant through the coolant flow path within fuel cell stack 22". When the required flow regime requires that the coolant flow be pulsed through the coolant flow path, controller 32" shuts down operation of first pump 90" and commands valve 94" to route all coolant flowing through coolant supply subsystem 30" to second pump 92". Controller 32" then commands second pump 92" to selectively pulse coolant through the coolant flow path of fuel cell stack 22". To vary the magnitude of the pulses of coolant flowing through fuel cell stack 22", the volume of second pump 92" can be adjusted (e.g., adjust the stroke). That is, by adjusting the volume of coolant in each pulse of pump 92", the quantity of coolant supplied by each pulse of second pump 92" can be adjusted. Controller 32" will command second pump 92" to pulse for the required period of time sufficient to remove the necessary waste heat from fuel cell stack 22" and to provide a flow velocity sufficient to remove gas bubbles. Controller 32" will command second pump 92" to remain idle providing no coolant flow through fuel cell stack 22" for the required no flow period of time.

It should be appreciated that second pump 92" does not need to be a positive placement pump. Rather, second pump 92" could be a continuous flow pump, such as a centrifugal pump, that is sized to provide the lower flow rates (relative to full power) and is able to be quickly turned on and off to pulse the required flow rate through the coolant flow path, or a centrifugal pump operating in recirculation mode, with recirculation turned off intermittently to provide the pulse of coolant.

Thus, the control strategy of the present invention provides for adjusting a coolant flow rate through the coolant flow path of a fuel cell stack to maintain the coolant (and cathode) temperature change across the coolant (and cathode) flow path substantially constant as the power level of the fuel cell stack changes. The temperature change is chosen for the specific fuel cell stack employed and results in a relative humidity profile that prevents flooding and drying out of the membranes within the fuel cells. The control strategy also enables high current density operation of the fuel cell stack during nominal operating conditions. The control strategy also enables a rapid return to high current density operation when an excursion outside of the high current density operating range occurs. The present invention also avoids large pressure differentials and/or large temperature differentials that may affect the durability and reliability of the fuel cell stack. The coolant flow rate through the fuel cell stack can be continuous and discontinuous or pulsing, as required, to maintain the temperature change at a fixed level. The control strategy can be implemented with a variety of mechanizations for a coolant supply subsystem. Furthermore, the control strategy can utilize an algorithm that models the response of the operation of the fuel cell stack or a look-up table that contains empirical data based on bench testing of the stack or a comparable fuel cell stack.

The description of the invention is merely exemplary in nature and variations that do not depart from the gist of the invention are intended to be within the scope of the invention. For example, different mechanizations for the coolant supply subsystem can be employed without departing from the spirit and scope of the present invention. Furthermore, other humidification devices or means for humidifying the cathode reactant flowing into the fuel cell stack can also be employed. Additionally, other pressure controls for the outlet pressure of the cathode effluent can also be employed. Thus, such variations are not to be regarded as a departure from the spirit and scope of the invention.

What is claimed is:

1. A method of operating a fuel cell system including a fuel cell stack and a coolant supply subsystem, the fuel cell stack having cathode and coolant flow paths therethrough, the method comprising:
   (a) operating the fuel cell stack to produce electricity;
   (b) monitoring a power level of the fuel cell stack;
   (c) determining a coolant flow through the coolant flow path to substantially achieve a predetermined coolant temperature change through the coolant flow path based on said power level; and
   (d) adjusting operation of the coolant supply subsystem to substantially achieve said determined coolant flow.

2. The method of claim 1, wherein (c) includes determining said coolant flow with a model that provides said coolant flow.

3. The method of claim 2, wherein (c) includes determining said coolant flow with a model that provides said coolant flow based on a prediction of an outlet relative humidity for a cathode gas flowing through the cathode flow path using a relative humidity of said cathode gas flowing into the cathode flow path, a pressure drop across the cathode flow path, said power level of the fuel cell stack, and said predetermined coolant temperature change.

4. The method of claim 1, wherein (c) includes accessing a look-up table that provides said coolant flow.

5. The method of claim 4, wherein (c) includes accessing a look-up table that provides said coolant flow based on an outlet relative humidity for a cathode gas flowing through the cathode flow path and taking into account a relative humidity of said cathode gas flowing into the cathode flow path, a pressure drop across the cathode flow path, said power level of the fuel cell stack, and said predetermined coolant temperature change.

6. The method of claim 1, wherein (d) includes providing said coolant flow as pulses of flow through the coolant flow path when said power level is below a predetermined threshold.

7. The method of claim 1, wherein (d) includes providing said coolant flow as a continuous stream through the coolant flow path when said power level exceeds a predetermined threshold.

8. The method of claim 1, further comprising maintaining a cathode gas relative humidity in the cathode flow path greater than about 40% and less than 100% during nominal operation.

* * * * *